US010718865B2

(12) United States Patent
Sloss

(10) Patent No.: US 10,718,865 B2
(45) Date of Patent: Jul. 21, 2020

(54) METHOD OF COMPRESSING BEAMFORMED SONAR DATA

(71) Applicant: Martyn Sloss, Fife (GB)

(72) Inventor: Martyn Sloss, Fife (GB)

(73) Assignee: Coda Octopus Group, Orlando, FL (US)

( * ) Notice: Subject to any disclaimer, the term of this patent is extended or adjusted under 35 U.S.C. 154(b) by 291 days.

(21) Appl. No.: 15/978,286

(22) Filed: May 14, 2018

(65) Prior Publication Data

US 2019/0346565 A1 Nov. 14, 2019

(51) Int. Cl.
*G01S 15/89* (2006.01)
*G01S 7/533* (2006.01)

(52) U.S. Cl.
CPC .......... *G01S 15/8961* (2013.01); *G01S 7/533* (2013.01); *G01S 15/8993* (2013.01)

(58) Field of Classification Search
CPC .. G01S 15/8961; G01S 15/8993; G01S 7/533; G01S 7/5273; G01S 15/89; G01S 15/42
See application file for complete search history.

(56) References Cited

U.S. PATENT DOCUMENTS

| | | | | |
|---|---|---|---|---|
| 6,438,071 B1 * | 8/2002 | Hansen | .................... | G01S 15/89 367/88 |
| 7,466,628 B2 * | 12/2008 | Hansen | .................... | G01S 15/89 367/11 |
| 7,489,592 B2 * | 2/2009 | Hansen | ................ | G01S 7/52004 367/12 |
| 7,898,902 B2 * | 3/2011 | Sloss | ...................... | G03B 42/06 367/7 |
| 7,907,079 B1 * | 3/2011 | Galloway | ........... | H03M 1/1014 341/155 |
| 8,059,486 B2 * | 11/2011 | Sloss | ...................... | G01S 15/89 367/72 |
| 8,854,920 B2 * | 10/2014 | Sloss | ...................... | G01S 15/89 367/88 |
| 9,019,795 B2 * | 4/2015 | Sloss | ..................... | G01S 7/6245 367/11 |
| 2010/0331689 A1 * | 12/2010 | Wegener | .................. | A61B 8/06 600/443 |
| 2017/0123061 A1 * | 5/2017 | Sloss | ....................... | G01S 15/89 |
| 2017/0315237 A1 * | 11/2017 | Steenstrup | .......... | G01S 15/8902 |
| 2019/0265343 A1 * | 8/2019 | Sloss | ...................... | G01S 7/533 |
| 2019/0317211 A1 * | 10/2019 | Sloss | ..................... | G01S 7/5273 |
| 2019/0346565 A1 * | 11/2019 | Sloss | ....................... | G01S 15/42 |

FOREIGN PATENT DOCUMENTS

| | | | | |
|---|---|---|---|---|
| CN | 110488303 A | * | 11/2019 | ......... G01S 15/8993 |
| EP | 3570069 A1 | * | 11/2019 | ......... G01S 15/8961 |
| JP | 2019200197 A | * | 11/2019 | ......... G01S 15/8961 |

\* cited by examiner

*Primary Examiner* — Daniel Pihulic

(74) *Attorney, Agent, or Firm* — Rodney T. Hodgson

(57) ABSTRACT

Beamformed sonar data is compressed before communicating the data to a storage step or to a further processing step. At lease some of the beams of the compressed beamformed data have values for at least two different ranges.

9 Claims, 3 Drawing Sheets

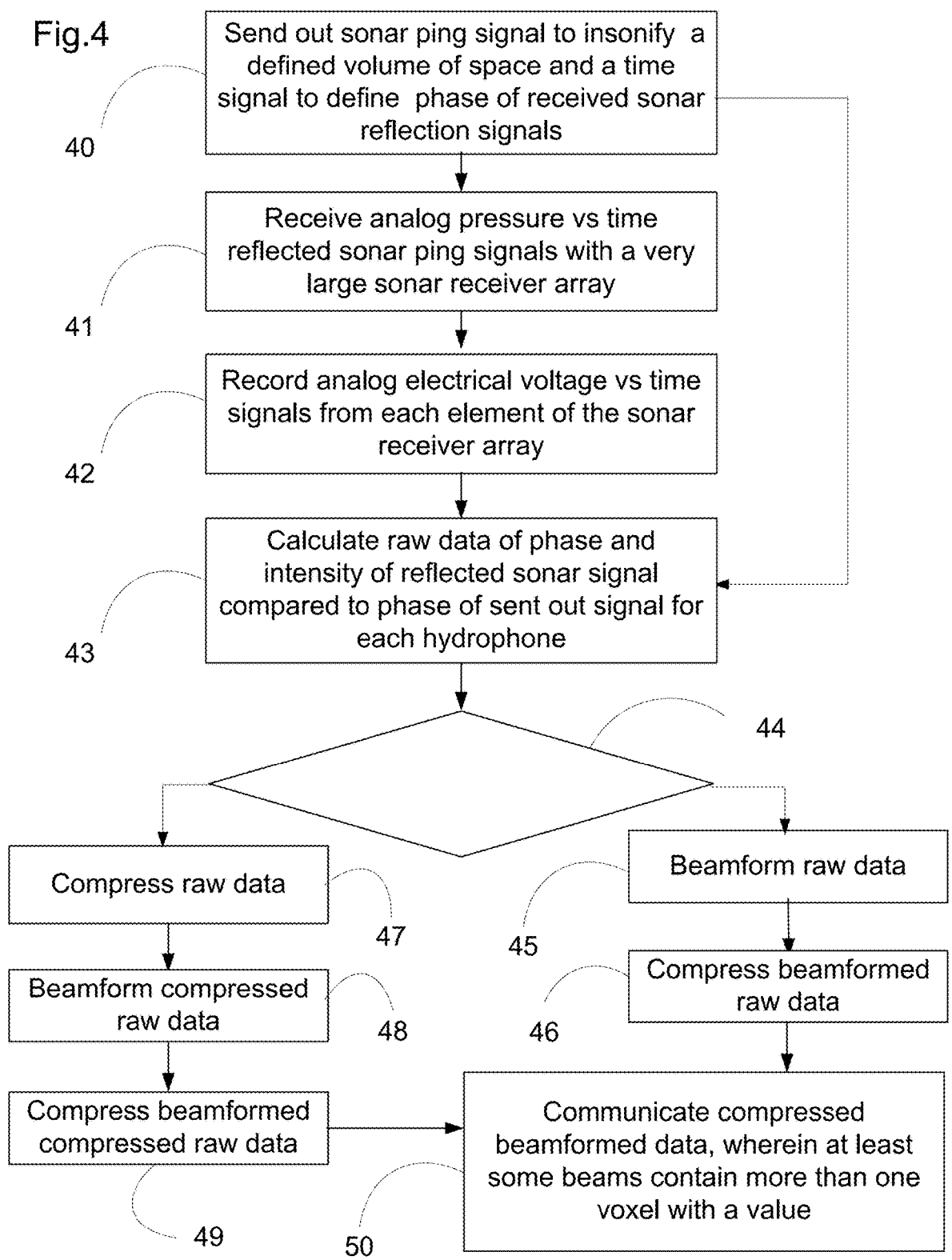

METHOD OF COMPRESSING BEAMFORMED SONAR DATA

FIELD OF THE INVENTION

The field of the invention is the field of visualization of data from sonar signals scattered from surfaces and measured with a large array of hydrophones.

RELATED PATENTS AND APPLICATIONS

The following US Patents and US patent applications are related to the present application: U.S. Pat. No. 6,438,071 issued to Hansen, et al. on August 20; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015; U.S. patent application Ser. Nos. 14/927,748 and 14/927,730 filed on Oct. 30, 2015, Ser. No. 15/908,395 filed on Feb. 28, 2018, Ser. No. 15/953,423 filed on Apr. 14, 2018 by Sloss are also related to the present application. The above identified patents and patent applications are assigned to the assignee of the present invention and are incorporated herein by reference in their entirety including incorporated material.

OBJECTS OF THE INVENTION

It is an object of the invention to compress beamformed sonar data in a novel way before communicating the beamformed data for further processing.

SUMMARY OF THE INVENTION

Raw sonar data comprising phase and intensity of sonar signals reflected from objects in an insonified volume of liquid is measured by a large array of hydrophones which returns raw data in the form of phase and intensity across the surface of the large array. The raw data is beamformed to give data such as intensity, range and angular position of the objects with respect to the large array. Prior art methods of compression of the beamformed data gave a single range and value for each beam in the beamformed data and discarded much potentially valuable data. The present invention shows a method to compress the beamformed data so that more than one range for at least some beams is returned.

BRIEF DESCRIPTION OF THE DRAWINGS

FIG. 4 shows a flow chart of the method of the invention.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sonar signal pulse is sent out from a generator into a volume of fluid, and reflected sound energy from objects in the insonified volume is recorded by one or more detector elements. The term "insonified volume" is known to one of skill in the art and is defined herein as being a volume of fluid through which sound waves are directed. In the present invention, a sonar signal pulse of sound waves called a ping is sent out from which insonifies a roughly conical volume of water.

Figure 1:
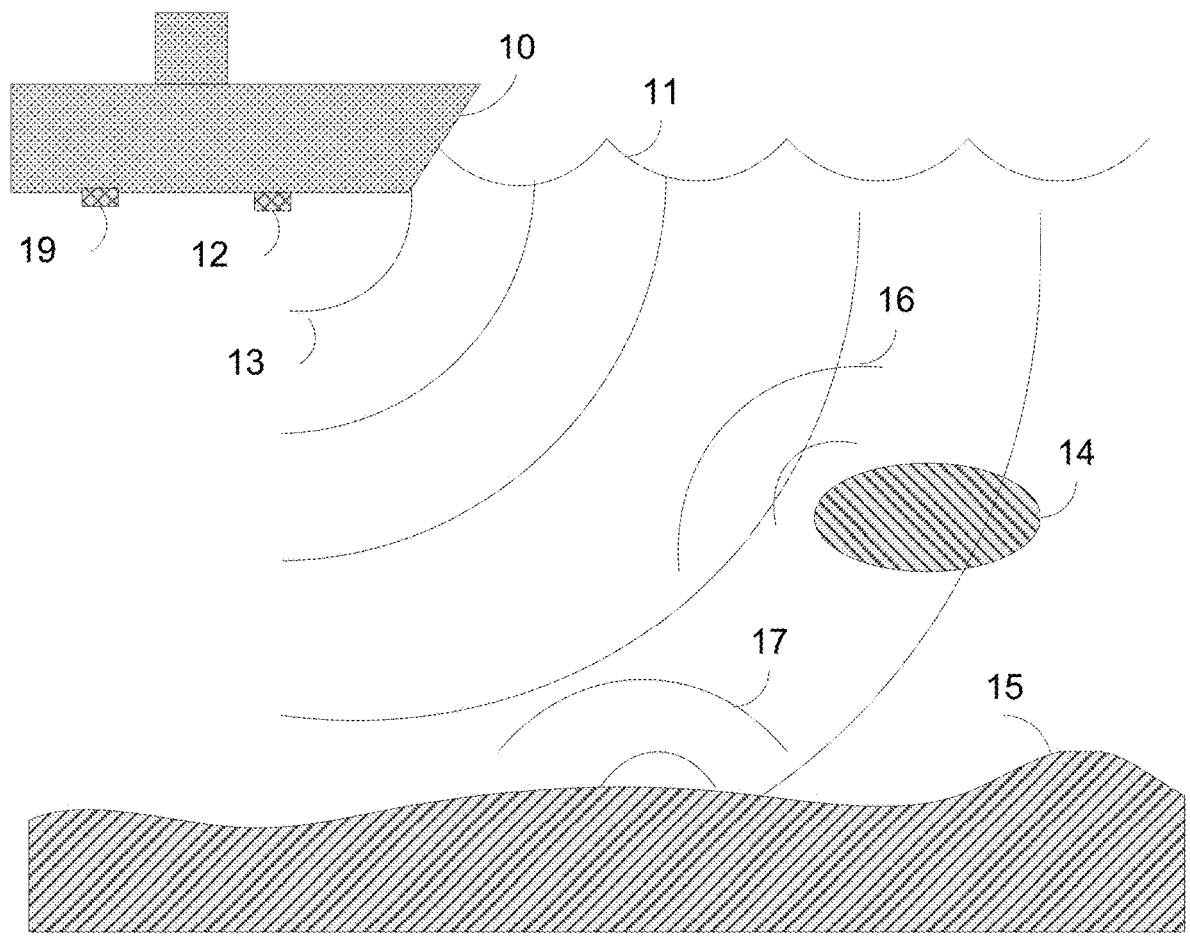
FIG. 1 shows a sketch of placement of sonar equipment.

FIG. 1 shows a sketch of a vessel 10 carrying an ultrasonic sonar generator or ping generator 12 under the water. The outgoing sound waves 13 of an outgoing ping impinge on an object 14 suspended in the water, sound waves 16 are reflected back towards a multielement sonar detector 19. Object 14 may be suspended in the water, lying on the seabed 15, or be buried in the sea bed 15. Sound waves 17 are also shown reflected from the seabed 15 towards the sonar detector 19. Sound waves 16 and 17 may also be rereflected (not shown) from the surface 11 of the water. A series of outgoing ping pulses may be sent out with an outgoing ping frequency $P_f$. A sonar ping generally has a constant sound frequency f. (The frequency f is sometimes changed in the prior art during the ping in a method called a chirped pulse ping, where the pulse frequency either increases or decreases monotonically throughout the pulse.) A master oscillator (not shown) produces a square wave voltage output at frequency f, and the ping generator uses the master oscillator to produce outgoing sinusoidal sound waves in phase with the master oscillator. The outgoing ping length $l_p$ and the outgoing ping time $t_p$ are related by the speed of sound in the water. A convenient outgoing ping length $l_p$ is about 4 cm.

A series of outgoing ping pulses may be sent out with a ping frequency $P_f$. Sound waves 13 are shown propagating as a cone shaped beam towards the object 14. The reflected sound waves 16 are received by each detector element of the large multielement sonar detector array 19, which measures the pressure vs time of the reflected ping sound waves at each element and returns an analog electrical voltage signal representing the amplitude versus time of the sound wave impinging on the element. The electrical voltage signals are digitally sampled at precisely known times with respect to the phase of the sent out sound waves of each ping. A large array multielement detector is preferably constructed with 24 by 24 or more sonar detector elements. More preferred is a multielement detector with at least 48 by 48 elements. Multielement detectors with at least 64 by 64 elements are most preferred.

The amount of data generated by such large array sonar detectors is usually too large either to transmit to the surface vessel from the array detector or to store for later analysis.

If the ping generator and sonar detector are close together, the first reflected ping signals arrive at the detector in approximately twice the time taken for the ping to travel from the ping generator to the closest object in the insonified volume. The measurement continues until the reflected sound from the furthest object of interest reaches the detector. The total measurement time may conveniently be subdivided into a series of slices each having a slice distance (which is set to match the desired range resolution) and a corresponding slice time $t_s$.

The analog electrical voltage signal from each element is digitized and treated to give raw data representing the reflected sonar wave phase and intensity for each detector of the multielement detector for each time slice.

A master oscillator square wave (running at frequency f) is used to provide pulses at frequency 4 f timed to the edges of the master oscillator square wave, so the received signal at each detector is sampled at phases 0, 90, 180, and 270 degrees of the master oscillator. The samples at 0 and 180 degrees give the real parts, and at 90 and 270 degrees the imaginary parts of the phase of the reflected sound wave with respect to the master oscillator. The sum of the squares of the real and imaginary parts give the intensity of the sound wave at each individual detector. The prior art sampled the sound wave pressure with 10 or 12 bit accuracy The reflected ping signals may be subdivided into a series of slices having a slice time $t_s$ and a slice length $l_s$. A convenient slice length $l_s$ is 4 cm. and a convenient transmit pulse length $l_p$ is about 12 cm. Each time slice is numbered from $t_1$ to $t_n$. A convenient sonar frequency of 375 KHz gives a sonar wavelength of about 4 mm, when the speed of sound in water is 1500 meters per second. Thus, for each slice, about 10 wavelengths of the reflected sonar beam are measured and windowed to produce one 10 or 12 bit imaginary number which gives the phase and intensity of the reflected wave measured by each detector for that time slice.

Figure 2:
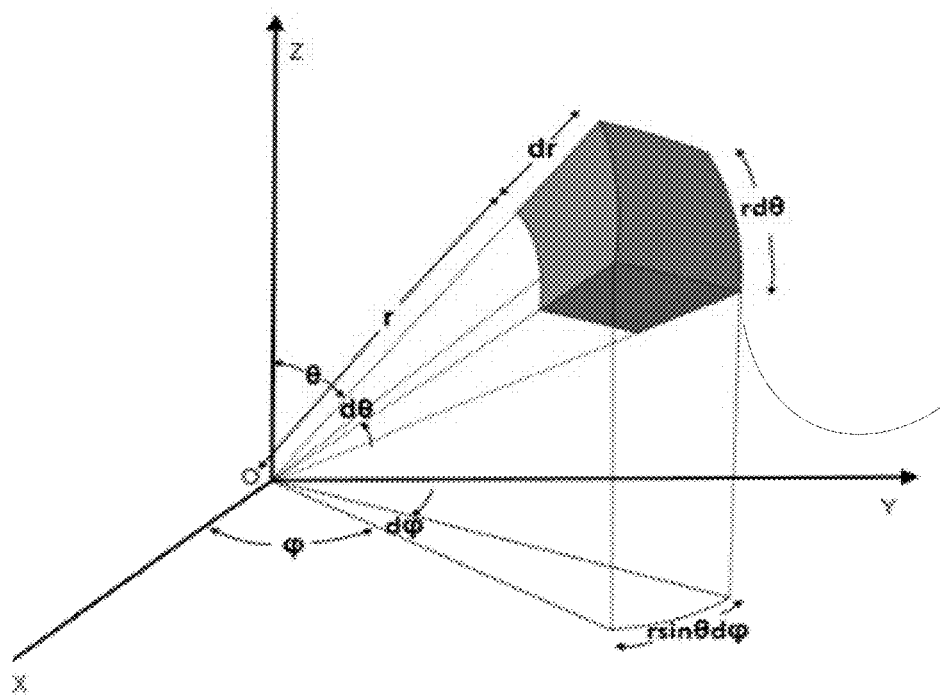
FIG. 2 shows a sketch of a 3 dimensional polar coordinate system with a single voxel.

The digitized data is then transformed with a beamformer program to provide points in 3 dimensional space from whence the sound wave must have been reflected. These points are most preferably represented in three dimensional space polar coordinates as a function of range and of two orthogonal angles with respect to the plane of the detectors. FIG. 2 shows a diagram of the coordinate system, where one voxel of length $\delta r$ having lateral dimensions $\delta r$, $r \delta\theta$, and $r \delta\phi$ (where $\theta$ and $\phi$ are measured in radians) is shown wherein the voxel at is located at range r and two orthogonal angular coordinates $\theta$ and $\phi$ from the origen. Fig. shows the volume of space of interest divided into a set S of a large number of voxels.

Beamforming the data registers a value for each voxel. The value is preferably the intensity of the signal sonar signal reflected from that point in space and measured at the array of detectors.

Figure 3:
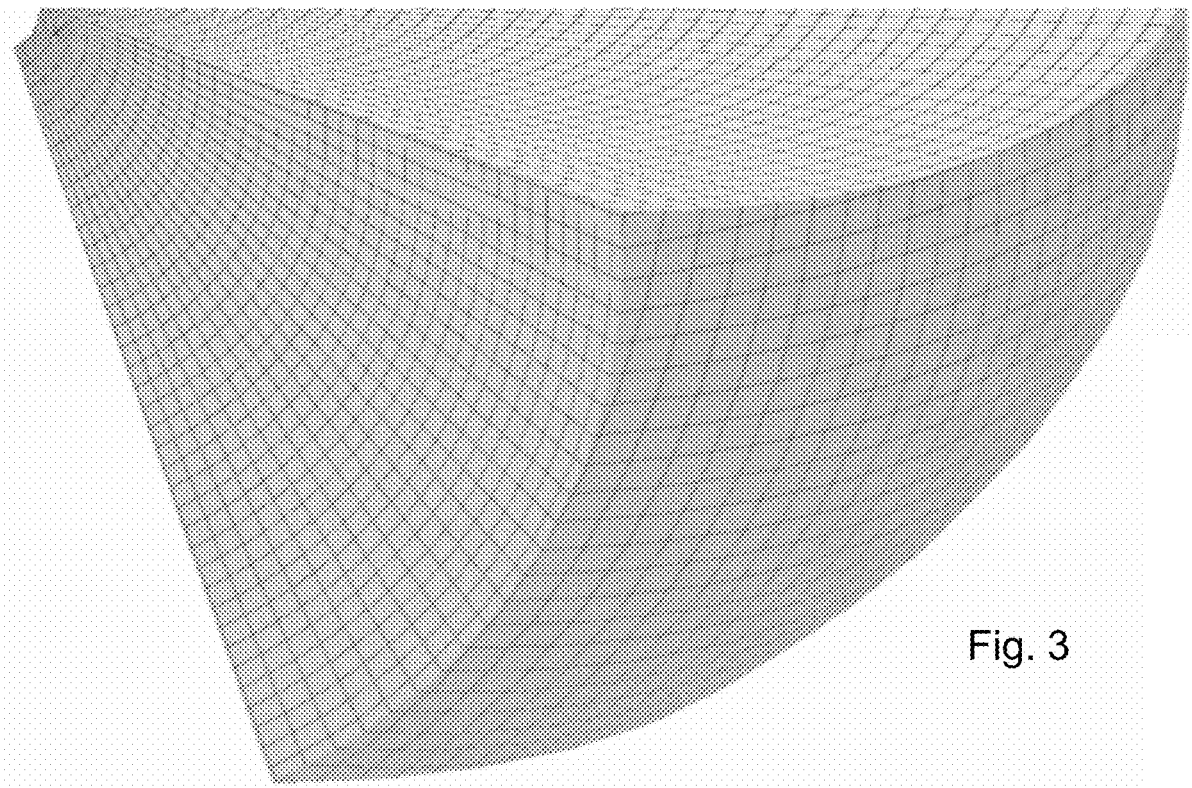
FIG. 3 shows a sketch showing beams defined in 3 dimensional space.

For the purposes of this specification, a beam is defined as a subset $S_{\theta,\phi}$ of the set S of touching voxels sketched in FIG. 3, wherein $\theta$, $\phi$, $\delta\theta$ and $\delta\phi$ are fixed for each beam, and r runs from integers 1 to N. A prior art beam is represented by a set $S_{\theta,\phi}$ has length N $\delta r$, with voxels of the same length $\delta r$ and increasing values $r\delta \theta$ and $r\delta \phi$. Thus, the area of the beam is continually increasing as it reaches further from the origin. In the interests of clarity, the beams of FIG. 3 are shown too large in to make the image clearer. In a typical set up with a large array of 48 by 48 detectors, a typical field of view would be about +/−22.5 degrees with respect to the normal to the detector surface. The data from the 48 by 48 detectors would be turned into 128 by 128 beams instead of the approximately 20 by 20 beams shown in the FIG. 3.

One characteristic of sonar data is that it is very sparse, as the ensonified volume is generally water having only one or a few objects of interest.

In other electromagnetic or ultra sound imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earths surface into the depths of the earth to return data of rock formations in the search for oil and gas produce dense data, and techniques developed for such fields would not in general be known or used by one of skill in the art of sonar imaging.

A previously submitted application U.S. Ser. No. 15/908, 395 filed on Feb. 28, 2018 is used to reduce compress raw data from sonar detecting array that is sent to the beamformer section or to a data storage system in, for example, a remotely operated vehicle (ROV). The beamformer, in the prior art of using large arrays of sonar detectors, receives uncompressed raw data about the reflected sound waves in the form of phase and amplitude information at each element of the large array. The beamformer would then calculate the points in space that would produce the phase and intensity raw data measured by each detector of the detector array and each time slice. The time slice gives the range, and the phase data gives the angles.

In the prior art of sonar scanning with large arrays of sonar detectors, the prior art compressed the beamformed data by transmitting an intensity data and a range number from just one voxel in each beam as defined in this specification. This data compression is not lossless data compression, which is defined as data compression which may be reversed to give the original data. Rather, the data is enormously compressed to give one or more values to a single voxel in each of the 128 by 128 beams.

Normally, either the "first above threshold" (FAT) intensity signal, or the maximum intensity signal (MAX) would be chosen to give a single value of a range for any particular values of the two orthogonal angles of a polar coordinate system. Setting the threshold of the FAT signal could, for example, ignore the signal from a fish with soft tissue and less reflectivity than a metal object or the seabed. Enormous amounts of data would then be discarded where, for example, less intense signals that were returned from other ranges in the same beam would be ignored.

The present invention improves the prior art by using the regularities in the beamformed data to compress the beamformed data before communicating the data for further processing. For example, the data from neighboring and next neighbor voxels in the same beam and in neighboring beams are compared advantageously to either increase or decrease the signal in a particular voxel. This compression technique works because he data are recorded simultaneously for each slice, and only milliseconds apart from slice to slice. Such compression techniques would, for example allow a noise datum to be discarded by comparing a voxel containing a value to the surrounding voxels. Or the data in a number of neighboring voxels are grouped, and fewer bits would be needed to describe the grouping than sending the data point by point. The reduction in data produced by the compression techniques such as noted above would allow data to be transmitted about more than one voxel per beam. Using the above mentioned compression techniques instead of the MAX or FAT techniques of the prior art allow useful data to be communicated through the data channels available in the allowable time, and allow values from more than one range to be communicated for at least some beams. In this way, two objects, one further away from the detector than the other, could be detected if the closer object did not completely obstruct the beam or if the closer object transmitted some of the sonar energy.

Another inventive compression step changes the constant change in range $\delta r$ from voxel to voxel if the prior art from a constant δr to a change in range which increases with r. A dimensionless number k is chosen so that the change in range from voxel to voxel is k r. k is preferably chosen to be approximately equal to δθ and δϕ. The volume of each voxel which in the prior art changes as $r^2$ now changes as $r^3$, and fewer voxels are needed to describe the same volume of space.

FIG. 4 shows a flow chart of the method of the invention. Step 40 sends out sonar ping signal to insonify a defined volume of space and a time signal to define phase of received sonar reflection signals. Analog pressure vs time reflected sonar ping signals are received with a very large sonar receiver array in step 41. Step 42 turns the pressure signals into analog electrical voltage vs time signals from each element of the sonar receiver array. Step 43 samples the analogue electrical voltage at times determined by the received time signals of step 40. Analogue to digital circuitry gives 10 or 12 bit accuracy values sampled at the times when the sent out signal frequency would have phases of 0, 90, 180 and 270 degrees. The numbers determined at 0 and 180 degrees determine the real part, and the numbers sampled at 0 and 180 degrees the imaginary part of the reflected signal. The phase and intensity constitute, by definition, raw data of phase and intensity of reflected sonar signal compared to phase of sent out signal for each hydrophone. In decision step 44, the raw data is sent either directly to a beamforming step 45, or to a raw data compression step 47. Raw data is beamformed in step 45 as in the prior art. The inventive step of the invention takes place in step 46, where the compression step returns more than one voxel per beam which has a value, instead of the prior art compressions steps where a single voxel having a value is returned for each beam. From step 46 compressed beamformed data is communicated from the sonar array to a topside imaging system, to topside storage, or to storage in a remotely operated vehicle carrying the sonar receiving array. Step 47 compresses the raw data as described in the related US application mentioned previously. Step 48 beamforms the compressed raw data in the same method of step 45, and beamformed data having more than one voxel having a range and a value for at least some beams is passed to communication step 50.

Obviously, many modifications and variations of the present invention are possible in light of the above teachings. It is therefore to be understood that, within the scope of the appended claims, the invention may be practiced otherwise than as specifically described.

I claim:

1. A method, comprising:
   a) insonifying a volume of fluid with a series of sonar pings, wherein the volume of fluid contains one or more objects;
   b) receiving sonar signals reflected from the one or more objects, wherein the sonar signals are received by a large array of hydrophones located in the volume of fluid, and wherein the large array of hydrophones produces a set of raw data points for each sonar ping, wherein the set of raw data points comprises electrical signals which measure the phase and the intensity versus time of the sonar signal received by each of the large array of hydrophones for each ping; then
   c) communicating the set of raw data points for each ping for further processing; then
   d) beamforming the raw data points to produce values associated with sonar reflections from the one or more objects, wherein the values are associated with a large plurality of beams defined in a coordinate system having origin near the center of the large array of hydrophones, wherein each beam is defined a set of adjacent voxels in a volume of space radiating outwardly from the origin, and wherein each beam has a cross sectional area which increases with range from the origin; and then
   e) compressing the beamformed data for at least one of the series of pings, wherein values are assigned are to two or more voxels in at least one or more separate beams, wherein the two or more voxels have different ranges from the origin; and then
   f) communicating the compressed beamformed data for further processing.

2. The method of claim 1, wherein the large array of hydrophones is arrayed as a two dimensional planar array having K by L elements, where both K and L are integers greater than 24.

3. The method of claim 2, wherein the coordinate system is a spherical polar coordinate system, and wherein the large plurality of beams are non overlapping beams, and wherein the communicated beamformed data is compressed by comparing voxels with neighboring voxiles in each beam and/or in neighboring beams.

4. The method of claim 3, wherein the large plurality of beams are non overlapping beams, and wherein the beamformed data is compressed by comparing voxels with neighboring voxiles in neighboring slices.

5. The method of claim 2, wherein the coordinate system is a spherical coordinate system, and wherein the large plurality of beams are non overlapping beams, and wherein the beamformed data is compressed by comparing voxels with neighboring voxels from preceding and/or succeeding pings in the series of pings.

6. A method, comprising:
   a) insonifying a volume of fluid with a series of sonar pings, wherein the volume of fluid contains one or more objects; then
   b) receiving sonar signals reflected from the one or more objects, wherein the sonar signals are received by a large K by L array of hydrophones located in the volume of fluid, and wherein each of the large array of hydrophones produces a set $S_{k\,l\,n}$ of raw data points for each of a number N of slices for each sonar ping, wherein each set $S_{k\,l\,n}$, (wherein k runs from 1 to L, l runs from 1 to L, and n runs from 1 to N), comprises electrical signals which measure the phase and the intensity versus time of the sonar signal received by each of the large array of hydrophones; then
   c) compressing the raw data for each ping by comparing the raw data from each hydrophone with raw data from neighboring hydrophones and/or raw data from preceding and following slices;
   d) beamforming the sets of compressed raw data points produce values associated with sonar reflections from the one or more objects, wherein the values are associated with a large plurality of beams defined in a coordinate system having origin near the center of the large array of hydrophones, wherein each beam is defined a set of adjacent voxels in a volume of space radiating outwardly from the origin, and wherein each beam has a cross sectional area which increases with range from the origin; and then
   e) compressing the beamformed data for at least one of the series of pings, wherein values are assigned are to two or more voxels in at least one or more separate beams, wherein the two or more voxels have different ranges from the origin; and then f) communicating the compressed beamformed data for further processing.

7. The method of claim 6, wherein;
in step c) the raw data is compressed by comparing data for each hydrophone with data from neighboring hydrophones in at least one slice of each ping.

8. The method of claim 6, wherein;
in step c) the raw data is compressed by comparing data for each hydrophone with data from neighboring slices for hydrophones at least some slices of each ping.

9. The method of claim 6, wherein;
in step c) the raw data is compressed by comparing data for each hydrophone with data from neighboring hydrophones from preceding and subsequent pings in the series of pings.

* * * * *